United States Patent [19]
Amacker

[11] Patent Number: 5,249,644
[45] Date of Patent: Oct. 5, 1993

[54] HOOK-TYPE TREE CLIMBING STAND

[76] Inventor: Joseph A. Amacker, 1212 Main St., Delhi, La. 71232

[21] Appl. No.: 818,262

[22] Filed: Jan. 8, 1992

[51] Int. Cl.⁵ .............................................. A63B 9/00
[52] U.S. Cl. ................................. 182/134; 182/187; 182/221
[58] Field of Search ............... 182/134, 135, 136, 221, 182/187, 189, 130; 224/160, 161; 108/108

[56] References Cited

U.S. PATENT DOCUMENTS

| | | | |
|---|---|---|---|
| 117,413 | 7/1871 | Hanger | 182/134 |
| 857,430 | 10/1907 | Youngquist et al. | |
| 1,091,977 | 11/1914 | Bloom . | |
| 2,009,474 | 7/1935 | Castelli | 182/134 |
| 2,039,185 | 4/1936 | Pfistershammer | 182/134 |
| 2,605,074 | 11/1948 | Bucsko et al. | |
| 3,004,622 | 10/1961 | Ringer | 182/134 |
| 3,340,961 | 9/1967 | Provaznik | 182/134 |
| 4,061,202 | 7/1977 | Campbell . | |
| 4,161,233 | 7/1979 | Wirtz | 182/187 |
| 4,225,013 | 7/1980 | Sample . | |
| 4,331,216 | 9/1982 | Amacker . | |
| 4,397,500 | 8/1983 | Moffitt | 182/187 X |
| 4,422,527 | 12/1983 | Schultz et al. | 182/187 X |
| 4,428,459 | 4/1984 | Peck . | |
| 4,553,634 | 1/1985 | Roberts et al. | |
| 4,597,473 | 10/1986 | Peck . | |
| 4,834,217 | 7/1989 | Manes . | |
| 4,969,538 | 8/1990 | Amacker . | |
| 5,040,635 | 8/1991 | Strickland | 182/189 X |

FOREIGN PATENT DOCUMENTS

| | | | |
|---|---|---|---|
| 369813 | 1/1921 | Fed. Rep. of Germany | 182/134 |
| 629762 | 8/1927 | France | 182/134 |
| 1199131 | 12/1959 | France | 182/134 |

*Primary Examiner*—Karen J. Chotkowski
*Attorney, Agent, or Firm*—Wigman & Cohen

[57] ABSTRACT

A tree climber comprising a pair of climbing members, adapted to be affixed to the user's feet by quick release straps. Each climbing member includes a support arm extending forward from a platform portion and terminating at one end of a moveable hook shaped clamping portion which engages the back side of the pole. Several embodiments show a clamping portion which is adjustably affixed to the terminus of the support arm with either a slidable collar and tube configuration or a clamped configuration. Another embodiment includes a slidable collar affixed to the platform portion, the support arm extending therethrough to a desired length corresponding to the diameter of the pole. The adjustable clamping portion of any of the embodiments may be used in combination with the extendable support arm to accommodate a wide range of tree trunk or pole diameters and to easily traverse protruding limbs which would otherwise arrest further vertical progress. A strapping assembly secures the tree climber to the tree at the desired elevation. In its collapsed configuration the climbing members are nested and easily transported or stored.

12 Claims, 4 Drawing Sheets

HOOK-TYPE TREE CLIMBING STAND

BACKGROUND OF THE INVENTION

1. Field of the Invention

The present invention relates to pole grasping-type climbers utilizing paired grasping structures, and more particularly, to paired tree climbing members which are worn on the feet to be alternately raised by the user to attain a desired elevation on a vertical member such as a pole, a tree trunk or the like.

2. Description of the Prior Art

According to the prior art, a variety of tree stands or climbers have become available commercially to serve as, for instance, elevated hunting platforms or work platforms for gaining access to elevated structures. One variety of tree climber comprises upper and lower climbing frames. Tree climbers of this variety described in U.S. Pat. No. 4,331,216 to the present inventor typically are comprised of paired grasping structures, each structure being moved independently of the other in a step-wise fashion to attain the desired elevation on the vertical member.

Typical of such conventional tree stands is the widespread use of bolted connections which must be properly completed and/or adjusted prior to use. Such connections and adjustments often prove time consuming and cumbersome, especially in the dark, and require the user to carry wrenches or similar tools into the field. According to some designs, a two-person assembly team is virtually a necessity in completing such installation.

Another problem with tree climbers of the prior art is the restrictive closed frame structure which encircles the tree or pole. Unless the tree is of a relatively uniform cross-section (not likely), protruding limbs of excessive length or other oversized outcroppings will prevent further vertical progress, or at least make it difficult to navigate around the obstruction. One solution to this problem is addressed in U.S. Pat. No. 4,225,013, the apparatus of which includes a pair of C-shaped arcuate clamping members which partially encircle the tree. In use, branches and other protrusions are passed through the open portion of the arcuate clamping members as the climber ascends and descends the tree. These C-shaped openings, however, will accommodate only those trees sized within a limited range of diameters. Another problem with this apparatus is the absence of the rigidity offered by various closed-frame designs.

Yet another problem with prior art devices is their relatively cumbersome bulk, even in their collapsed condition, which hinders transportability especially over heavily wooded terrain.

OBJECTS AND SUMMARY OF THE INVENTION

It is therefore an object of the present invention to provide a tree or pole climbing device which is readily assembled, even in darkness, and which is easily adjusted, both during and after installation about the pole, tree trunk, or other similar vertical member, and during removal therefrom, such assembly, adjustment, and removal readily accomplished by a single person.

It is another object of the present invention to provide a tree or pole climbing device which can readily accommodate and operate on vertical members having a relatively wide range of diameters.

It is a further object of the present invention to provide a tree or pole climbing device which can easily traverse those protruding limbs of excessive length and other oversized outcroppings extending from the vertical member which otherwise hinder vertical access by the user.

It is yet another object of the present invention to provide a tree or pole climbing device which offers a relatively rigid structure while affixed to the vertical member and which safely secures the climber to the vertical member.

A further object of the present invention is to provide a climbing stand having relatively compact dimensions when in the collapsed condition, and which is easily transportable by a single person.

A still another object of the present invention is to provide a safety strap which is engaged with the climbing device and with the tree or pole to add further security to the user. These and other objects are achieved in the present invention which includes two climbing members which are attached to the climbing feet and alternately raised in a stepwise fashion while ascending or descending the tree to attain the desired elevation. Each foot climbing member includes a platform portion and a clamping portion. The platform portion is affixed to the user's feet by a set of quick release straps. A support arm extends forward from each platform portion and terminates at a clamping portion rigidly attached thereto. The clamping portion has a hook or bow-like shape with its concave side directed back toward the platform portion. Teeth-like protrusions are integrally formed within the concave side and engage with the back side of the tree pole. The forward-most edge of the platform may also include said teeth-like protrusions for engaging with the front side of the tree pole. The climbing members are constructed to be mirror images of each other to be respectively worn on the right and left feet of the user.

One end of the clamping portion is releasably affixed to the support arm. In a like manner, the support arm is releasably affixed to the platform portion. According to the invention and its various embodiments, the clamping portion is adjustable relative to the platform portion so as to accommodate vertical members having a wide range of diameters. According to one embodiment, a flanged end of the clamping portion is releasably engaged with the channel of the support arm and secured thereto at any of a selection of engagement points arrayed along in the support arm by a spring-tensioned locking pin passing through and securing together both elements. According to a second embodiment, the end of the clamping portion is affixed to a collar through which a tubular support arm slidably extends. A spring-tensioned or other quick-release locking pin is passed through overlapping engagement holes in both members to secure them together.

A third embodiment of the present invention replaces the spring-tensioned locking pin of the first embodiment with a knurl-ended bolt which secures the flange of the clamping portion to the support arm. According to any one of the first three embodiments, the support arm extends out of the plane of the platform portion at a predetermined angle, the support arm collapsing against the platform portion during transport. According to a fourth embodiment, the platform end of the support arm telescopes through a collar which is rigidly affixed to an upturned edge of the platform portion. The support arm of this embodiment is longitudinally fixed within the collar at any one of an array of spaced-apart engagement holes disposed in the support arm through which a spring-tensioned locking pin, knurl-ended bolt or the like is passed to secure together the two elements.

After the climbing members have been vertically moved by the user in stepwise fashion to the desired elevation the top climbing member, and each of the climbing members is then secured to the tree by a strap lock referred to as an "Am-Lock" strap. The Am-Lock strap includes two hooks securely fixed to the opposite ends of a sturdy strap and a tensioning device affixed intermediate the hooks. The strap is wrapped about the diameter of the vertical member and the hooks are affixed to opposite ends of the climbing member. Optionally, notches may be formed into the hook portion or the climbing member to accommodate the hooks. The tensioning device is then operated to bring the strap into a tightened embracing relationship with the vertical member and the clamping portion.

Adjustable backpack-style carrying straps are attached to the platform portion to enable transportability. When not in use, the straps are folded and stored within recesses formed in insulative seat cushion material layered on the platform portion.

With the foregoing and other objects, advantages and features of the invention that will become hereinafter apparent, the nature of the invention may be more clearly understood by reference to the following detailed description of the invention, the appended claims and to the several views illustrated in the drawings.

DETAILED DESCRIPTION OF THE PREFERRED EMBODIMENTS

Figure 1:
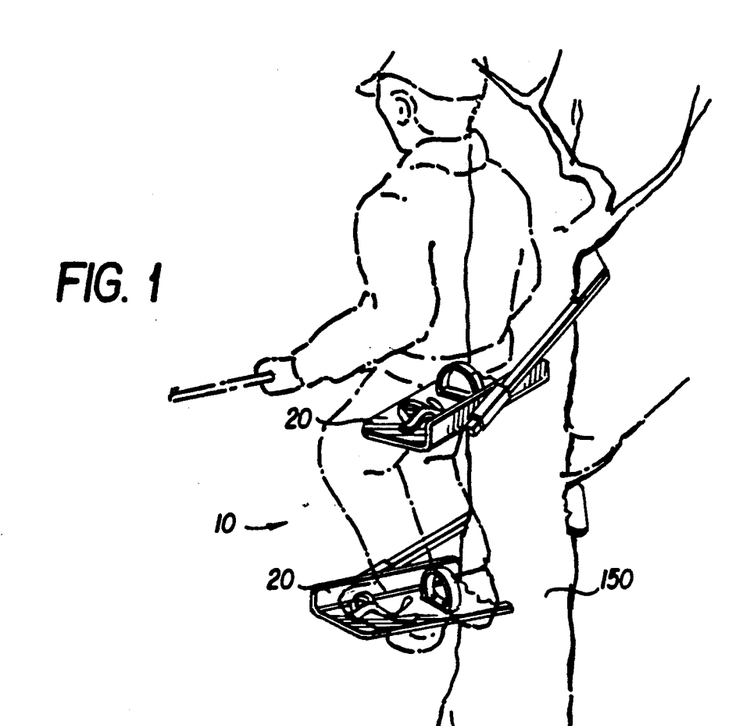
FIG. 1 is a pictorial view of the tree climbing members of the present invention shown mounted in a tree and supporting a hunter.

Referring now in detail to the drawings wherein like parts are designated by like reference numerals throughout, there is illustrated in FIG. 1 a pictorial view of the climbing stand of the present invention mounted in a tree and supporting a hunter, the tree climbing stand designated generally by reference numeral 10. The climbing stand 10 comprises a pair of left and right members, each of which is designated generally by reference numeral 20.

Figure 2:
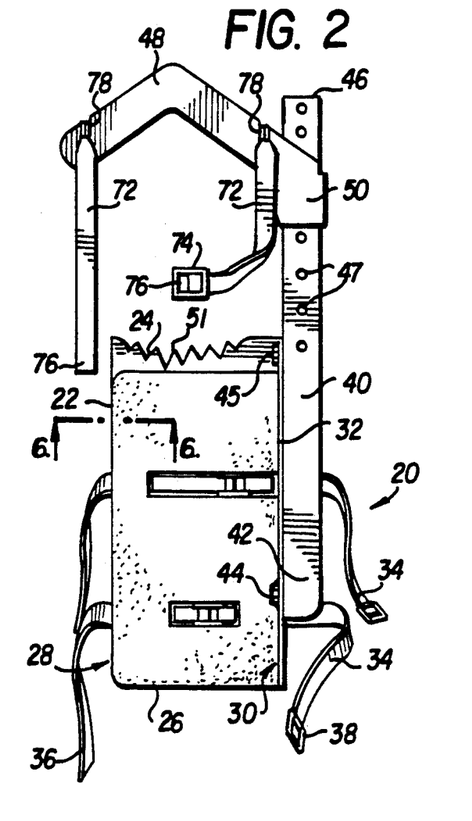
FIG. 2 is a top plan view of one of the paired climbing members of the first embodiment of the invention, said climbing member, worn on the right foot of the user.

Now referring to FIG. 2, each climbing member 20 made in accordance with this invention includes an elongated platform portion 22 constructed preferably of a sturdy metal such as sheet steel or aluminum. The platform portion 22 includes a forward end 24, a back end 26, and is framed along its length by a pair of substantially parallel edges 28,30. An upturned edge 32 integrally formed with the platform portion 22 is disposed along the outer parallel edge 30 of a right climber member 20 worn on the user's right foot. In like manner, an upturned edge 32 is integrally formed with the platform portion 22 of a left climber member, said upturned edge 32 disposed along a corresponding outer parallel edge 28 of the platform portion 22. The platform portion 22 is affixed to the user's foot by two paired sets of quick release strap means 34. The strap means 34 comprise a tongue end 36 disposed on one of each pair of strap means 34, said tongue end 36 adjustably engagable with a cinch-type fastening means or buckle 38 disposed on each of the corresponding strap means 34 of each pair.

Figure 3:
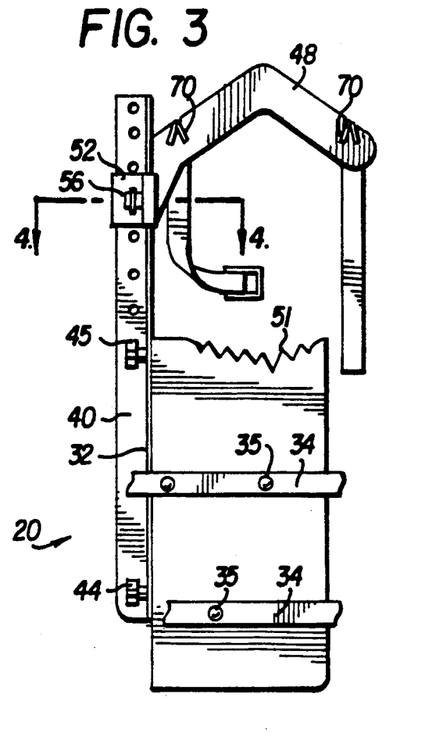
FIG. 3 is a bottom plan view of the climbing member of the embodiment shown in FIG. 2.

Referring to FIG. 3, which is a bottom view of the climbing apparatus shown in FIG. 2, the strap means 34 are shown securely fastened to the platform portion 22 with a bolted connection 35 passing therethrough.

A flange 41 of the support arm 40 is disposed parallel to the upturned edge 32 of the platform portion 22. A back end 42 of the arm 40 is affixed to the upturned edge 32 by a bolted connection 44 which enables the arm 40 to swivel out of the plane of the platform portion 22 as will be further described. The forward end 46 of the support arm 40 extends beyond the forward end 24 of the platform portion 22. A plurality of spaced attachment holes 47 are disposed along the length of the support arm 40 to accommodate the varying diameter of poles encountered during use.

A clamping portion or hook 48 is adjustably affixed to the extended support arm 40. The clamping portion 48, which is constructed of a relatively stiff and strong metal such as steel, has a bow-like shape with its concave side directed back to the platform portion 22 when one end 50 of the clamping portion 48 is affixed to the support arm 40. An array of teeth-like protrusions 51 are integrally formed along the forward edge 24 of the platform portion 22 to securely engage with the pole. Optionally, another array of such protrusions (not shown) are integrally formed along the concave side of the clamping portion 48. In those instances where it is desirable to protect the tree from injury by a conventional protective sheath having protrusions 51, a U-shaped cross-section (not shown) made of a non-skid material such as an elastomer may be removably positioned over the protrusions 51.

Figures 4, 5, 6:
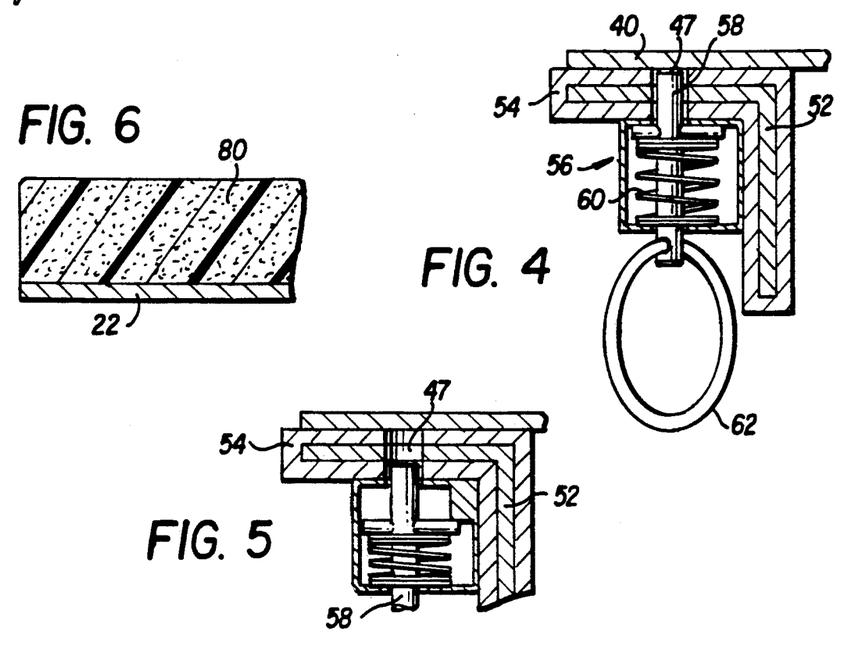
FIG. 4 is an enlarged side view of FIG. 3, partially in cross-section, of the spring-tensioned locking member in an engaged position and securing together the clamping member and support arm of one embodiment of the invention.
FIG. 5 is a fragmentary view of FIG. 4, showing the spring-tensioned locking pin in a withdrawn, disengaged position.
FIG. 6 is an enlarged, fragmentary, cross-sectional view of the platform portion of the climbing member shown in FIG. 2, showing the platform and seat cushion material.

Referring now to FIGS. 2-5, in one of the preferred embodiments the clamping portion end 50 includes a flange 52 with an L-shaped cross-section which is slidably engaged with a corresponding channel 54 disposed in the support arm 40. The clamping portion end 50 is slidably adjustable along the length of the support arm 40. After the climbing member 10 has been adjusted about the tree member (not shown) such that the forward end 24 of the platform portion 22 and the clamping portion 48 are in simultaneous contact with the tree, the clamping portion 48 is engaged with the support arm 40 at the appropriate one of the attachment point recesses 47 with a quick-release spring-tensioned locking device 56. Locking device 56 which is also described in my concurrently filed patent application entitled "Automatically Adjustable Tree Climbing Stand" and is incorporated herein by reference, includes an engagement pin 58 which is biased into engagement by a spring 60, causing projection of the pin 58 into the overlapped engagement recesses 47 of the support arm channel 54 and clamping portion flange 52, as shown in FIG. 4. To disengage the engagement pin 56 from the openings 47 for purposes of adjustment, disassembly, or maintenance, a pull ring 62 affixed to the opposite end of the pin 56 is grasped and pulled to slidably withdraw the pin 56 from said recesses 47.

Referring to FIGS. 1-3, 15, after the user has reached the desired elevation, each of the climbing members 20 are secured thereto by a strapping system called the "Am-Lock" strap available from Amacker International, Inc. of Delhi, La. As shown in FIG. 15, the Am-Lock strap includes two hook means 70 disposed at opposite ends of a bifurcated strap 72. A tensioning device 74 joins together the bifurcated ends 76 of the strap 72 at an intermediate location thereof.

Figure 2A:
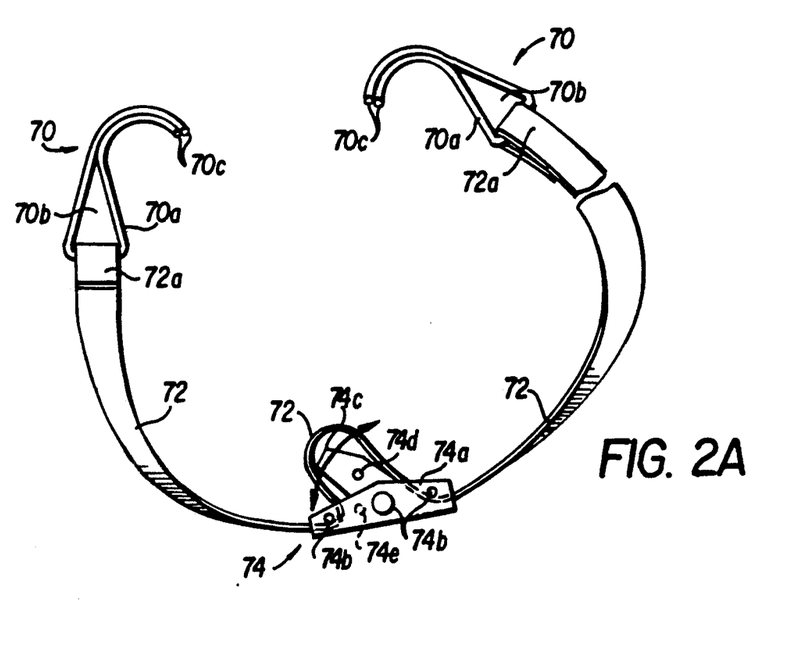
FIG. 2A is a pictorial view of the Am-Lock strap shown in FIG. 2 in a detached condition from the clamping portion of the climbing member, illustrating additional details of the strap.

Additional details of the Am-Lock strap are shown in FIG. 2A which illustrates the strap in a detached condition from the clamping portion 48 of the climbing member 20. Each hook means 70 is comprised of a single length of metal rod 70a which is formed into a doubled-over structure having an eyelet 70b at one end and paired opposite ends 70c formed into C-shaped or L-shaped hooks. The eyelet 70b of each hook means 70 engages with a strap end 72a passing therethrough.

The tensioning device 74 is comprised of a ladder-type buckle 74a having a plurality of crossbars 74b. A lever 74c is rotatably affixed to an inboard crossbar 74b. Laterally extending protrusions 74d disposed on the lever 74c engage with corresponding detents 74e disposed in the buckle 74a when the lever 74b is rotated into a locked position. The strap 72 is threaded in a serpentine manner into one end of the unlocked buckle 74a, between the crossbars 74b, about the lever 74c, and exits at the opposite end of the buckle 74a after passing around another crossbar 74b. When the lever 74c is rotated into the locked position, the strap 72 becomes firmly cinched within the buckle 74a. Tensioning adjustment is made by altering the length of strap 72 within the buckle 74a. Alternatively, a bifurcated strap (not shown) may be used, having one bifurcated end affixed to an outboard crossbar 74b, the other bifurcated end threaded into the tensioning device in the above-described manner from the opposite end of the buckle 74a. Tensioning adjustment is accomplished by extending or withdrawing the strap through the buckle 74a prior to locking.

In operation, the Am-Lock strap is straddled about the diameter of the pole 150 and each hook means 70 is engaged with opposite ends of the clamping member 48. Optionally, spaced notches 78 may be formed on the outside surface of the clamping member 48 to receive the hook means 70. The tensioning device 74 is then operated to bring the strap 7 into a tightened embracing relationship with the pole 150 and the clamping portion 48 to add an additional degree of rigidity and security to the climbing member 20. According to the invention, the Am-Lock strap may be similarly used in conjunction with any of the variety of commercially available tree stands or pole climbers having pole-embracing clamping members, including but not limited to those pole climbing devices having cross-bar, square-shaped, or arcuate-shaped clamping members.

Now referring to FIG. 6, an enlarged, fragmentary, cross-sectional view of the platform portion 22 of the climbing member 20 shown in FIG. 2 shows a foam cushion layer 80 placed on the platform 22. The cushion 80 is resilient, and protects the users feet while climbing and serves as a soft seat while waiting.

Figure 7:
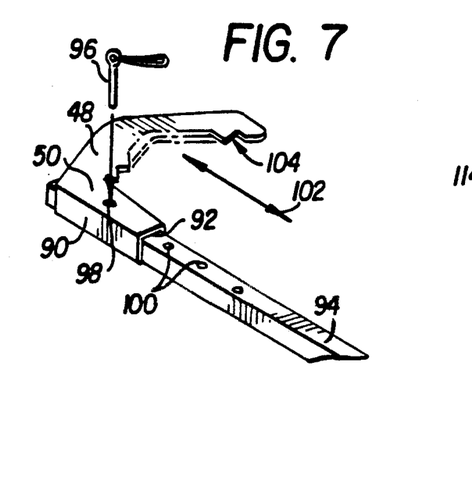
FIG. 7 is a perspective view of the engaged clamping portion and support arm of a second embodiment of the invention.

A second embodiment of the present invention is shown in FIG. 7. According to this embodiment, the flanged clamping or gripping end 50 of the first embodiment shown in FIGS. 2 and 3 is replaced with a rigid metal square collar 90 having a square shaped opening 92 through which a tubular support arm 94 having a corresponding cross-section extends. An engagement recess or hole 98 is disposed in the square collar 90. A plurality of engagement recesses or holes 100 is arrayed along the length of the support arm 94. A retention pin 96 is projected through the collar recess 98 and one of the overlapping support arm recesses 100, and secured thereto, to rigidly affix the support arm 94 at a desired extension relative to the collar 90, after adjustment of the support arm 94 along the direction of the arrow 102. An array of teeth-like protrusions 104 is arrayed along the concave side of the clamping member 48 for gripping the tree 150 at a chosen elevation.

Figure 8:
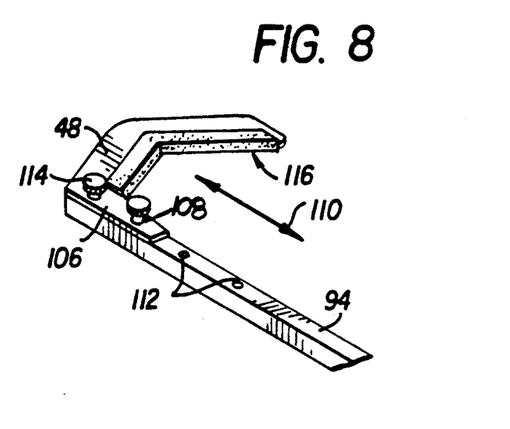
FIG. 8 is a perspective, partially exploded, view of the engaged clamping portion and support arm of a third embodiment of the invention.

A third embodiment of the present invention is shown in FIG. 8. According to this embodiment, the square collar 90 of the second embodiment shown in FIG. 7 is replaced with a planar flange element 106. At least two engagement recesses 108 are disposed through the element 106. The clamping member 48 of this embodiment is positioned longitudinally relative to the platform member (not shown) in the direction shown by arrow 110 such that the two engagement recesses 108 overlap two similarly spaced-apart engagement recesses 112 disposed through the support arm 94. A bolted connection utilizing a knurl-knob bolt 114 is projected through each of the overlapped recesses 108,112, the bolt end captured by a securing nut (not shown) affixed to an inner surface of the support arm 94. Alternatively, the support arm recesses 112 may be tapped such that the bolts 114 may be securely engaged therein. A protective U-shaped sheath 116 is shown installed along the concave side of the clamping portion 48 in the manner previously described to protect the tree from the teeth 51 shown in FIG. 7.

According to any of the three embodiments described above and shown in FIGS. 2-8, the support arm 40,94 is pivotable about the bolted connection 44 through the upturned edge 32 of the platform portion 22. The support arm 40,94 is pivoted to a desired angle, such as 30 degrees from the plane of the platform portion 22, to establish the necessary structural and geometrical relationship of the support arm 40 and its attached clamping member 48 with the pole, and also to orient the platform member 22 in a generally preferred horizontal position relative to the ground.

Figure 9:
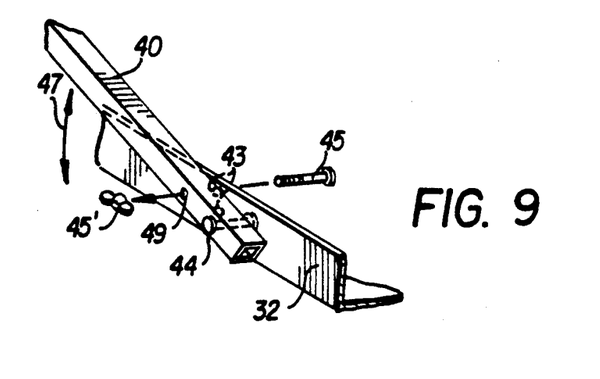
FIG. 9 is a perspective, partially exploded, fragmentary view of the angularly adjustable support arm of any of the first three embodiments engaged with an upturned edge of the platform portion.

Now referring to FIG. 9, the support arm 40,94 is shown in an operative position after being reoriented along the direction of the arrow 47 from its collapsed position within the plane of the platform portion 22. Two angularly spaced apart engagement recesses or holes 43, relative to the pivoting connection 44, are disposed in the upturned edge 32 and selectively correspond with an overlapping recess 49 disposed in the support arm 40. A bolt 45 and wingnut 45' secures the support arm 40,94 either within or without the plane of the platform portion 22 in a collapsed or operative position, respectively, after the bolt 45 has been simultaneously projected through the corresponding engagement recesses 43,49.

Figure 10:
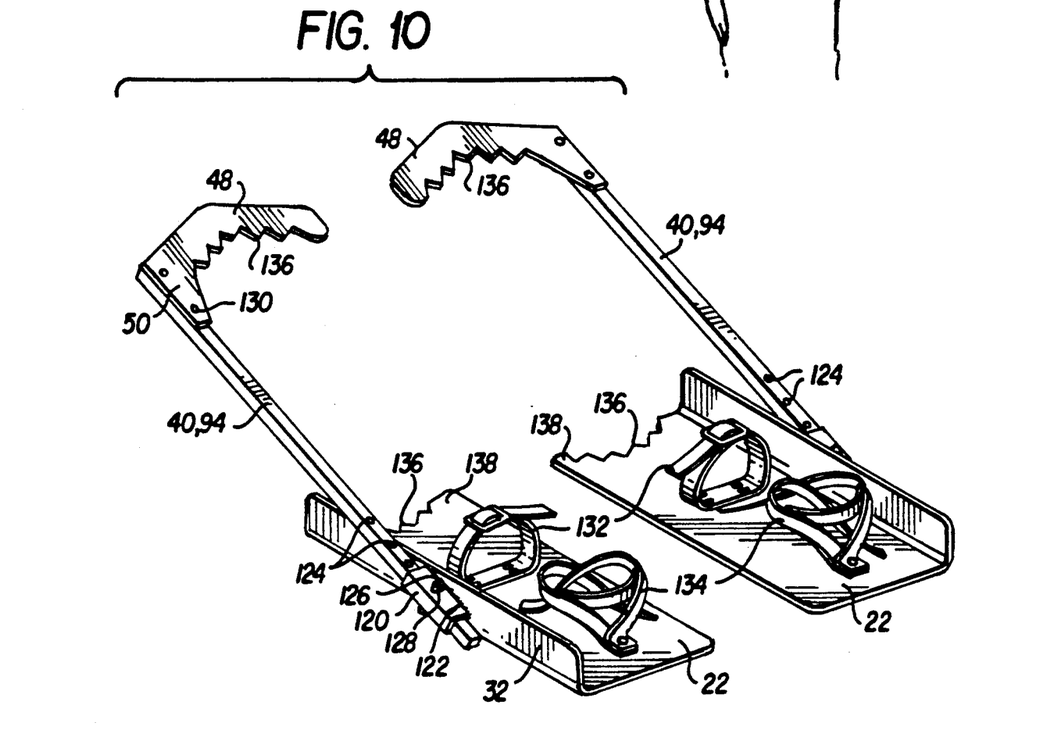
FIG. 10 is a perspective view of the paired climbing members of a fourth embodiment of the invention.

A perspective view of a fourth embodiment of the present invention is shown in FIG. 10. The pivotable connection 44 of the first three embodiments previously described is replaced with a rigid metal square collar 120 having a corresponding shaped opening through which any of the support arms 40,94 may slidably extend. The collar 120 is rigidly affixed by a weld bead 122 to the upturned edge 32 of the platform portion 22, and extends angularly outwardly from the plane of the platform portion 22 at about a 30 degree angle. A lengthwise array of engagement recesses or holes 124 are disposed along the platform portion end of the support arm 40,94. An engagement recess 126 is disposed through the collar 120. After the support arm 40,94 has been extended a desired length through the collar 120, a locking pin 128 is projected through the collar engagement recess 126 and then through the support arm recess 124 corresponding to the desired extension. Now referring to the clamping portion end of the support arm 40,94, it will become clear to one skilled in the art to which this invention pertains that any of the configurations of the first three embodiments previously described may be affixed thereto to provide an extensive degree of flexibility including the ability of the apparatus to accommodate poles 150 of extreme girth. In like manner, the support arm 40,94 may be extended to enable easy traversal about protruding limbs of excessive length or other oversized protrusions. According to FIG. 10 and for exemplary purposes only, the flanged end portion 50 of the third embodiment is shown affixed to the support arm 40,94 by locking pins 130. Other connecting devices such as bolts may be used. Quick release strap means 132 of the type previously described affix the climber 10 to the user's feet prior to ascending or descending the tree or pole in a stepwise manner. The strap means may also be configured with an ankle encasing arrangement 134 to provide additional stability to the user. As shown in this view, an array of pole-engaging protrusions 136 are integrally formed into the concave side of the clamping portion 48, as well as along each of the forward platform edges 138.

Figure 11:
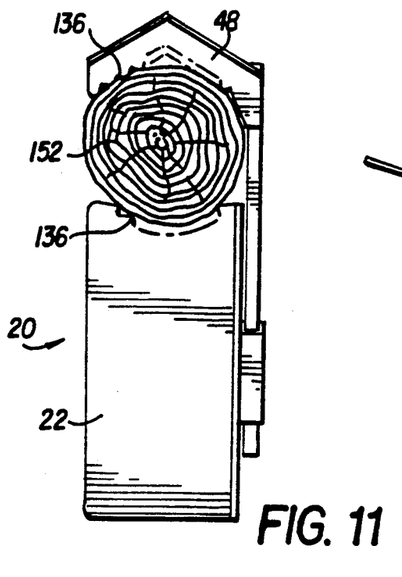
FIG. 11 is a top plan view of a right-foot climbing member of the fourth embodiment of the invention, in its mounted position about a vertical member such as a tree trunk.
Figure 12:
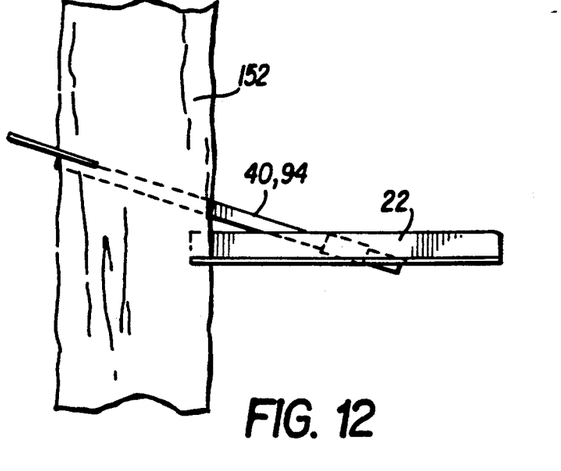
FIG. 12 a side view of FIG. 11, partly in cross-section, showing the preferred mounted position.

FIG. 11 is a top plan view of a right-foot climbing member 20 of the fourth embodiment of the invention shown in its mounted position about a pole 150. Protrusions 136 disposed on both platform and clamping portions 22,48 are shown engaging with an exemplary tree trunk 152 shown in this view. A side view of the embodiment of FIG. 11, partly in cross-section, is shown in FIG. 12, further illustrating the preferred mounting angle of the platform portion 22 relative to the support arm 40,94 and the tree trunk 152 on which the climber 10 is mounted. The angle between the plane of the platform portion 22 and the support arm 40,94 is about 30 degrees, and the platform portion 22 is about perpendicular to the longitudinal axis of the tree trunk 152.

Figure 13:
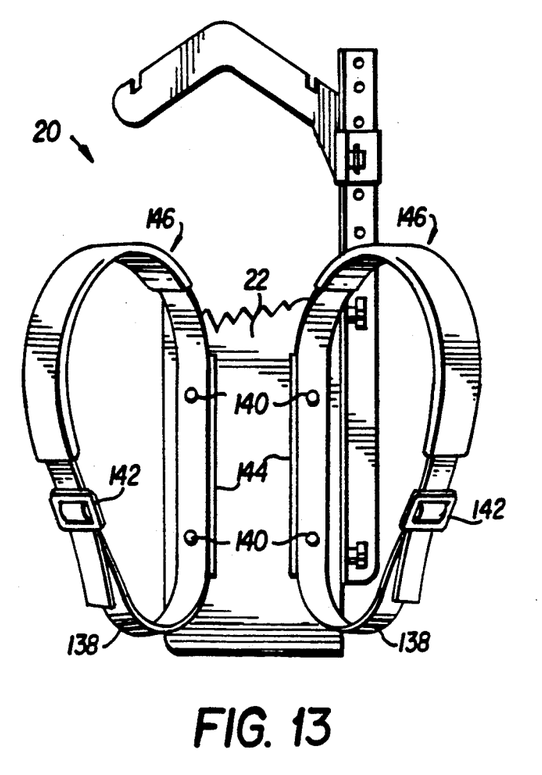
FIG. 13 a top plan view of a right-foot climbing member of the first embodiment of the invention, further showing the carrying straps positioned for transport.
Figure 14:
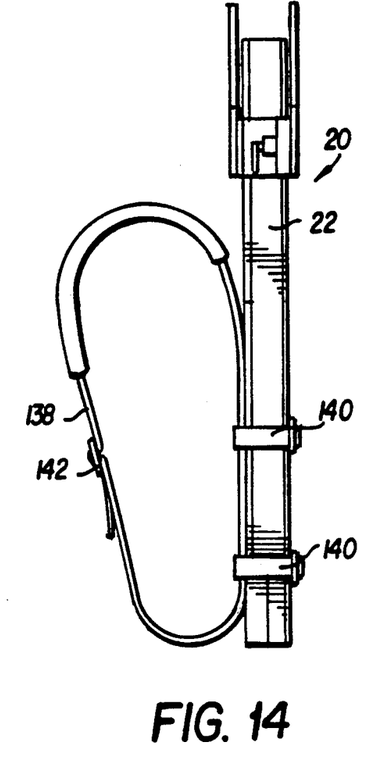
FIG. 14 is a side view, partly in cross-section, of the carrying straps and climbing member shown in FIG. 13.

Now referring to FIG. 13, a top plan view of a right-foot climbing member 20 of the first embodiment of the invention shows a pair of adjustable carrying straps 138 for transporting the climber 10 in a backpack-like manner. Each of straps 138 is affixed to the platform portion 22 with a pair of bolted or riveted connections 140, and is adjustable through a buckle means 142. When the climber 10 is not being transported, the straps 138 are folded and stored within recesses 144 formed into the seat cushion material layered on the top side of the platform portion 22. Padded sleeves 146 may be installed about the straps 138 to provide an additional degree of carrying comfort to the user during transport. FIG. 14 is a side view, partly in cross-section, of the embodiment of FIG. 13, further showing the carrying straps 138 affixed to the collapsed climber 10, the climber 10 shown in its fully transportable configuration.

Only one of the climbing devices 20 is provided with carrying straps 138 since the other climbing device may be compactly nested there with the Am-Lock strap device, previously mentioned, and can be used to maintain the two climbing devices in a compact nested condition during transportation or storage.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. Apparatus for engaging a generally vertical member for supporting a user above the ground, comprising:
   a platform having one end thereof adapted for engaging the vertical member, the platform further including a foot receiving means;
   a support arm supported along a longitudinal edge of said platform extending beyond the platform toward the vertical member;
   a bow-shaped clamping portion secured on one end to the support arm and movable with respect to said platform to accommodate vertical members of various cross-sections, the other end of the clamping portion forming an opening with the platform for receiving the vertical member therebetween, the clamping portion having a concave side cooperating with the engagement end of the platform to secure the apparatus to the vertical member;

a safety strap being removably affixed to the clamping portion at opposite ends thereof for securing the clamping portion to the vertical member in a tightened embracing relationship after the apparatus has been mounted at a desired elevation above the ground.

2. The apparatus according to claim 1, wherein the safety strap includes two free ends and an adjustable buckle therebetween.

3. The apparatus according to claim 2, further comprising at least one hook securely affixed to the safety strap for engaging said clamping portion.

4. The apparatus according to claim 2, further comprising a hook disposed at each of said free ends for engaging said clamping portion.

5. The apparatus according to claim 3, wherein said clamping portion includes an opening for securely receiving said hook.

6. The apparatus according to claim 4, wherein said clamping portion includes two spaced openings for securely receiving each of said hooks.

7. Apparatus for engaging a generally vertical member for supporting a person above the ground, comprising a pair of right and left climber members each comprising;
a generally rectangular platform portion including a forward end, a back end, and an upturned edge for joining together the forward and back ends;
means provided at said forward end of said platform portion for gripping said vertical member;
means provided at said platform portion for receiving one foot of said person;
a flanged support arm affixed to said upturned edge, said arm extending forward of said forward end, said forward extending portion having a plurality of spaced openings arrayed therealong to the forwardmost terminus of the support arm;
a bow-shaped clamping portion having one end thereof adjustably affixed to said flanged support arm by a spring-tensioned locking pin projecting through the clamping portion end and the support arm at any one of said spaced openings to accommodate vertical members of various diameters, the other end of said bow-shaped portion forming an opening with the platform for receiving said vertical member, the clamping portion having a concave side cooperating with the gripping means of the platform portion to secure the apparatus to the vertical member;
means provided along the concave side of said clamping portion for gripping said vertical member; and
a safety strap being removably affixed to the clamping portion at opposite ends thereof for securing the clamping portion to the vertical member in a tightened embracing relationship after the climbing member has been mounted at a desired elevation above the ground.

8. The climbing apparatus according to claim 9, wherein the safety strap includes two free ends and an adjustable buckle therebetween.

9. The climbing apparatus according to claim 8, further comprising at least one hook securely affixed to the safety strap for engaging said clamping portion.

10. The climbing apparatus according to claim 8, further comprising a hook disposed at each of said free ends for engaging said clamping portion.

11. The climbing apparatus according to claim 9, wherein said clamping portion includes an opening for securely receiving said hook.

12. The climbing apparatus according to claim 10, wherein said clamping portion includes two spaced openings for securely receiving each of said hooks.

* * * * *

UNITED STATES PATENT AND TRADEMARK OFFICE
CERTIFICATE OF CORRECTION

PATENT NO. : 5,249,644
DATED : October 5, 1993
INVENTOR(S) : Joseph A. AMACKER

It is certified that error appears in the above-identified patent and that said Letters Patent is hereby corrected as shown below:

Column 4, line 7, after "FIG. 12" insert --is--;
         line 9, after 'FIG. 13" insert --is--.

Column 6, line 16, "7" should be --72--.

Claim 8, column 10, line 23, "claim 9," should be --claim 7,--.

Signed and Sealed this

Thirty-first Day of May, 1994

Attest:

BRUCE LEHMAN

Attesting Officer        Commissioner of Patents and Trademarks